United States Patent
Coontz

[11] 3,749,180
[45] July 31, 1973

[54] BULLDOZER ATTACHMENT FOR TRACTORS

[76] Inventor: John G. Coontz, Box 104, Kiowa, Kans. 67070

[22] Filed: Dec. 27, 1971

[21] Appl. No.: 211,946

[52] U.S. Cl.................... 172/801, 172/308, 37/42
[51] Int. Cl.............................................. E02f 3/76
[58] Field of Search.................. 172/801, 805, 806, 172/276, 272, 273, 297, 305, 308, 298, 299, 303; 37/42

[56] References Cited
UNITED STATES PATENTS

| | | | |
|---|---|---|---|
| 3,548,956 | 12/1970 | Hochstetler | 172/801 |
| 3,217,431 | 11/1965 | Heinzroth et al. | 37/42 |
| 3,199,236 | 8/1965 | Bartel et al. | 172/806 |
| 3,436,847 | 4/1969 | Grimes | 172/276 X |
| 3,007,266 | 11/1961 | Brand | 172/308 X |
| 3,640,005 | 2/1972 | Chiarolanza et al. | 172/805 X |

Primary Examiner—Robert E. Pulfrey
Assistant Examiner—Stephen C. Pellegrino
Attorney—John H. Widdowson

[57] ABSTRACT

A bulldozer blade and frame for a tractor vehicle is provided. The frame has a forward vertically pivotal portion. This portion forward mounts the blade on a single pivot about a vertical axis. Removable locking pins permit fixing the blade and forward frame structure in desired relative position. Means are provided to remotely position the blade.

4 Claims, 4 Drawing Figures

Patented July 31, 1973

INVENTOR
JOHN G. COONTZ

BY John H. Wilkinson

ATTORNEY

INVENTOR
JOHN G. COONTZ
BY John H. Wilkinson
ATTORNEY

BULLDOZER ATTACHMENT FOR TRACTORS

Numerous types of bulldozer structures are known in the prior art which are adaptable to be mounted with tractors and the like. However, these prior art devices are usually constructed so as to be mountable only with one and possibly two different tractor configurations. None of the prior art devices provide a bulldozer structure which is adapted to be more or less universally mounted with a tractor. Additionally, the prior art devices are attached to the tractor as a unit and the earthworking blade and its supporting structure must be removed from the tractor as a complete unit, which is very unhandy if the need arises to use the tractor without the bulldozer apparatus mounted on it. Also prior art bulldozers practically as a matter of course are constructed so they can be operated by a winch and cable apparatus or by one or more hydraulic cylinders that must be connected to and operated by the tractor.

In one preferred specific embodiment of this invention, a bulldozer structure includes a support frame assembly adapted to be mounted with a tractor, a mounting assembly vertically pivotable from the support structure, an earthworking blade transversely pivotally mounted with the mounting assembly, an operator to raise and lower the blade and mounting assembly and separate means on the mounting assembly to transversely pivot the earthworking blade relative to the mounting assembly. The support frame structure has a pair of elongated members attachable to the underneath side of the tractor structure which extend from its rear portion past the forward end of the tractor and have an upright end portion. The mounting assembly is pivoted from the lower forward end of the elongated support members about a horizontal axis and has a pivotal mount on its forward end to attach the earthworking blade structure to it. The earthworking blade structure is adapted to be pivotally secured to the mounting assembly and pivot with it about a vertical axis having a locking apparatus to fix it in position. Raising and lowering of the mounting assembly and earthworking blade is accomplished by an operator that is connected between the upright forward end of the elongated members and the mounting assembly.

One object of this invention is to provide a bulldozer structure attachable to conventional tractors that overcomes the aforementioned disadvantages of the prior art devices.

Still, one other object of this invention is to provide a bulldozer structure having a supporting structure to which the blade is attached that is universally mountable with conventional tractors on their underneath side connectable to the forward and rear portions thereof.

Still, another object of this invention is to provide a bulldozer structure that has an earthworking blade which can be raised and lowered vertically and pivoted transversely and which can be fixed in position.

Yet, one other object of this invention is to provide a bulldozer structure that has an earthworking blade which can be fitted with a hydraulic cylinder operator or fitted with a hand-operated operator.

Yet, one additional object of this invention is to provide a bulldozer structure which is economical to manufacture, and easily attachable to a variety of different makes and models of conventional tractors by virtue of its universally adaptable mounting.

Various other objects, advantages, and features of the invention will become apparent to those skilled in the art from the following discussion, taken in conjunction with the accompanying drawings, in which.

Figure 1:
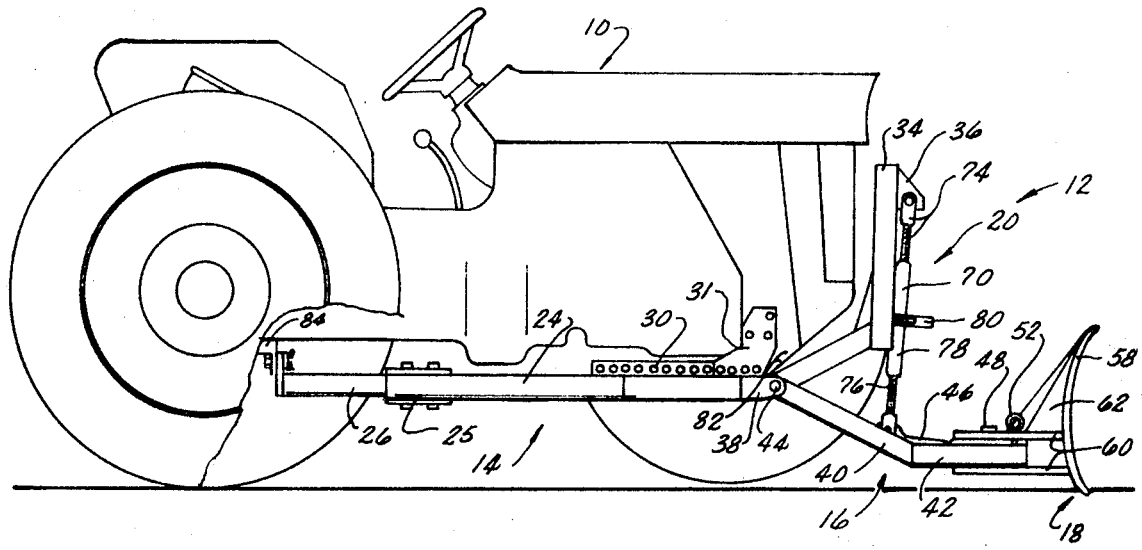
FIG. 1 is a side elevation view of the bulldozer structure mounted on a tractor, having portions of the tractor removed for clarity, and the bulldozer structure having a hand-operated screw operator.

The following is a discussion and description of preferred specific embodiments of the bulldozer structure of this invention, such being made with reference to the drawings, whereupon the same reference numerals are used to indicate the same or similar parts and/or structure. It is to be understood that such discussion and description is not to unduly limit the scope of the invention.

Figure 4:
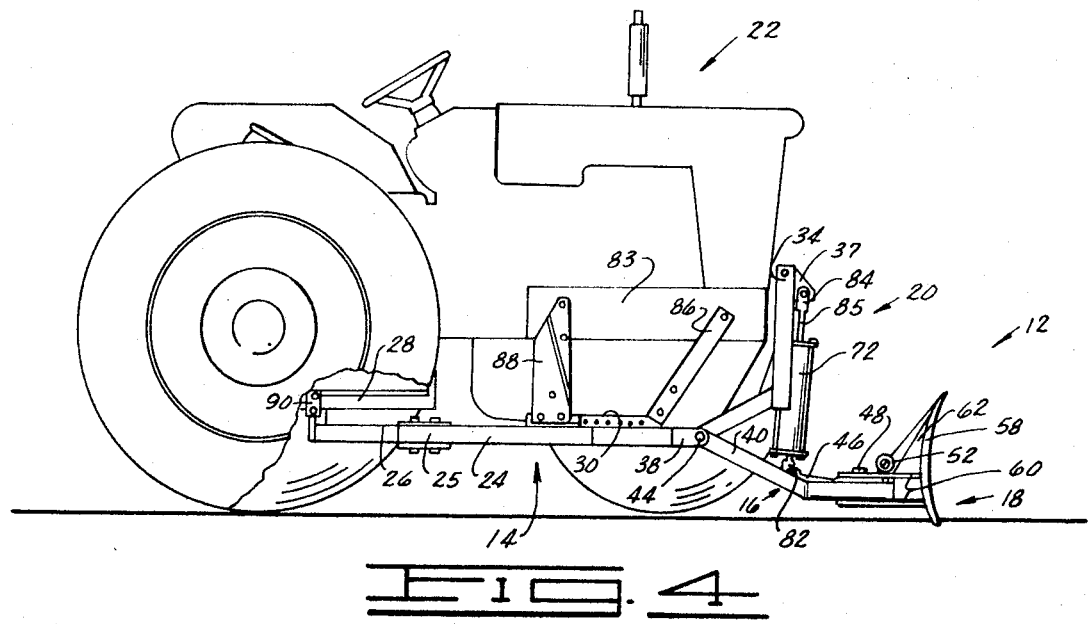
FIG. 4 is a side elevation view of the bulldozer assembly mounted on a tractor different from the one shown in FIG. 1 and having a hydraulic operator.

Referring to the drawings in detail and in particular to FIG. 1, a conventional tractor is shown therein, indicated at 10, with the bulldozer structure of this invention mounted thereto, as is indicated generally at 12. The bulldozer structure 12 includes a support frame assembly 14 mounted with the underneath side of the tractor 10, a mount assembly 16 connecting the support frame assembly 14 to an earthworking blade 18. The mount assembly 16 and earthworking blade 18 are raised and lowered by an operator, indicated at 20. The earthworking blade 18 is rotatable transversely by a pivotal connection with the mount assembly 16. The frame assembly 14 is adapted to be mounted in a universal fashion with one style of tractor as is shown in FIG. 1 and with another style of tractor 22 as is shown in FIG. 4.

The support frame assembly 14 of the bulldozer structure has a pair of elongated side members 24 to be generally positioned and mounted on the underneath side portions of a tractor forming the primary attachment for the bulldozer structure to the tractor. The elongated side members 24 are joined on their joining rear portion, as indicated at 25 with an elongated rear extension member 26 adjustably mounted therein which is preferably connected to the draw bar 28 of the tractor 10. The rear extension member 26 is preferably bolted to the junction 25 of the elongated side members to provide for its extensional adjustment. Along the forward portion of the elongated side members 24 an elongated perforated mount member 30 is attached to their upper side; it is used to mount the forward portion of the support frame assembly 14 to the tractor. FIG. 1 shows the perforated mounting plates 30 connected to the tractor 10 by auxiliary plate members 31. The forward end of the support frame assembly 14 has a transverse member 32 between the elongated side members 24. The upright forward end portion of the support frame assembly 14 has a pair of upright members 34 joined to the transverse member 32 and extending from it forward and upward to be positioned in front of the tractor. Between the upper end portion of the upright members 34 an operator mounting block 36 is mounted. The operator mounting block 36 is clearly shown in FIG. 3; it is preferably vertically adjustable and positioned between the upright members 34. The lower forward portion of the frame assembly 14 has a clevis yoke on each side, indicated at 38, which is used for attaching the mount assembly 16.

Figure 3:
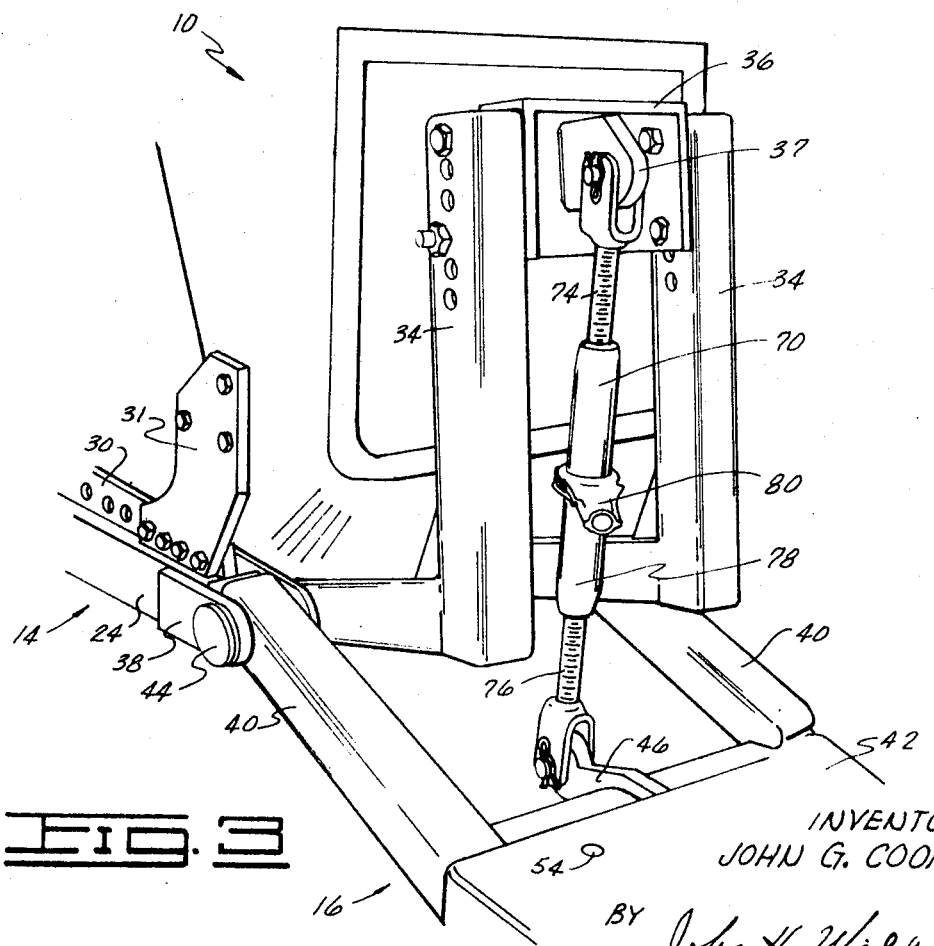
FIG. 3 is a perspective view of the front end portion of the tractor and bulldozer structure shown in FIG. 1, taken from behind the blade showing in detail the front portion of the support frame assembly and the hand-operated screw operator.

The mount assembly 16 includes a pair of arms 40 connecting it with the support frame assembly 14 and having a blade mounting block 42 between them at their outer end. The inner end of the arms 40 is connected to the clevis yoke 38 on the support frame assembly 14 by pins indicated at 44. On the rear portion of the blade mounting block 42 a lug 46 is provided to connect the mounting assembly 16 with the lower end of the operator 20. The blade mounting block 42 is connected with the earthworking blade 18 by a pivot pin 48 which is inserted through a passageway 50 in the blade mounting block 42 and through an aperture 51 in the rear portion of the earthworking blade assembly 18. Transverse rotation of the earth-working blade 18 is about the pin 48 with a position locking pin 52 provided to lock the earthworking blade in a fixed position relative to the mount assembly 16. The locking pin, as can be seen in FIG. 1, passes through any of a plurality of passageways 54 in the blade mount block 42 in connection with passing through at least one of the apertures 56 on the earth-working blade assembly 18. Preferably a number of passageways 54 are provided in the blade mounting block 42 so that the earthworking blade assembly 18 can be positioned in the straight-ahead position and in an angular position as desired by the user. On the earthworking blade assembly 18 one locking pin aperture 56 is provided on opposite sides of the pivot pin aperture 51 in a diametrically opposed relation. Providing pairs of locking pin apertures and passageways allows for two locking pins to be used for safety. The connection of the mount assembly arms 40 and the frame assembly 14 is best seen in FIG. 3.

Figure 2:
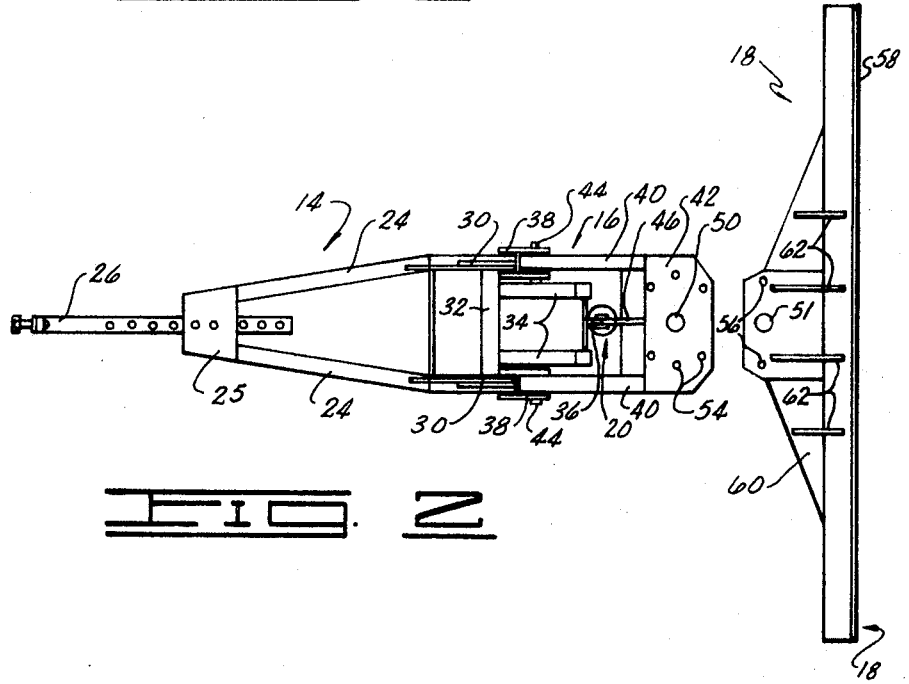
FIG. 2 is a top plan view of the bulldozer structure shown with the earthworking blade removed therefrom.

The earthworking blade assembly 18 has a curved earth contacting blade 58 with blade backing plates 60 on its back side engageable with the blade mount block 42. The blade backing plates 60 are best seen in FIG. 2 where the blade assembly 18 is separated from the support frame assembly 14. The blade backing plates 60 are preferably generally triangular in their overall shape so as to distribute the load from the earth contacting blade 58 to the pivot pin 48 and mounting block 42. A plurality of brace members 62 extend upward from the backing plates 60 to the upper portion of the earth contacting member 58 to add additional bracing. The earth contacting portion of the blade shown here is the general purpose type; however, it is to be understood that the specific blade structure shown in the drawings is not to unduly limit the use of this invention with other blades or earth-working devices having special features or special utility functions.

The operator 20 is connected between the operator mounting block 36 and the mount assembly 16. One operator 20 shown with this invention is preferably a screw type operator 70 as is shown in FIG. 1 and FIG. 3; another operator 20 is a hydraulic cylinder operator 72 as shown in FIG. 4. The screw type operator 70 is included in the herein described invention for its use with a tractor that does not have a hydraulic power system and additionally to provide a bulldozer structure of the most economical nature. The hydraulic operator 72 is shown with the herein described invention to provide a bulldozer structure which can be used with a tractor having a hydraulic system or where hydraulic operation is preferred.

The screw operator 70 is basically a large turnbuckle connected so that rotation of its center portion will raise and lower the mount assembly 16 relative to the tractor 10. The screw operator has an elongated threaded end portion on its upper end 74 connected by a clevis to the lug 37 of the operator mount block 36; it has another elongated threaded member 76 on its lower portion connected by a clevis to the mounting block lug 46. The center portion of the screw operator 78 connects both of the threaded end portions 74 and 76 and has a ratchet handle attachment 80 for use in rotating it to change the length of the operator 70. The ratchet handle attachment 80 is adapted to have an extension handle connected therewith to provide additional leverage that may be needed to rotate the center portion 78. The upper and lower threaded portions, 74 and 76, of the screw operator 70 have oppositely turned threaded portions so that rotation of the center portion in one direction will either pull the threaded portions together or move them apart thereby raising or lowering the mount assembly 16 relative to the tractor 10. In practice the screw type operator 70 provides the most economical means of raising and lowering the mount assembly 16 and earthworking blade assembly 18 and holding it in a fixed position for use. For safety reasons the screw type operator 70 should be hand operated only when motion of the tractor is stopped.

The hydraulic operator 72 like the screw operator 70 is connected between the lug 37 on the operator mounting block 36 and the lug 46 on the rear of the blade mounting block 42. The lower end of the hydraulic operator 72 has a clevis connecting the cylinder to the lug 46, and the upper end of the hydraulic operator 72 has a clevis 84 connecting the piston shaft 85 of the operator to the lug 37. The cylinder of the hydraulic operator 72 is preferably connected to a hydraulic control valve and the hydraulic system (not shown in the drawings) of the tractor on which the bulldozer structure 12 is mounted. Control of the hydraulic operator is preferably such that the mount assembly 16 and earthworking blade 18 can be raised and lowered relative to the tractor. An advantage to using the hydraulic operator 72 is that the earthworking blade's position can be adjusted while the tractor is moving, and can be adjusted by the operator of the tractor when seated in his operating position.

In accordance with one primary objective of this invention, which is to provide a bulldozer structure which is universally adaptable for use with several styles and makes of tractors, the drawings show the bulldozer structure mounted on two different styles of tractors. FIG. 1 shows the bulldozer structure of this invention 12 mounted on a No. 40 Massey-Ferguson tractor and FIG. 4 shows bulldozer structure 12 mounted on a No. 990 David Brown tractor. Mounting of the bulldozer structure 12 on the Massey-Ferguson tractor is accomplished by the use of front auxiliary mounting plates on each side of it, indicated at 31, connecting the perforate mounting members 30 on the elongated frame sides 24 to the forward attachment mounting point 82 of the tractor; and by the use of a rear push bracket 84 connecting the rear extension member 26 to the draw bar of the tractor. Mounting of the bulldozer structure 12 on the No. 990 David Brown tractor is accomplished by the use of two mounting brackets 86 and 88 connecting the forward attachment mounting member 83 of the tractor to the elongated perforate mounting members 30 and a rear push mount bracket 90 connecting the rear extension member 26 to the draw bar 28 of the tractor. It is obvious that similar but specifically different mount brackets can be used to mount the perforate mounting members 30 and the rear extension member 26 to tractors other than the two shown here in the drawings. It is also obvious that by the use of auxiliary brackets and the like the forward portion of the bulldozer structure can be connected to various tractor structures by use of the perforated mounting members 30, and that the rear of the bulldozer structure can be connected by the rear extension member to a tractor structure for support. It is also obvious that the forward end of the bulldozer assembly with the elongated perforated mounting members 30 can be used to attach the bulldozer structure 12 to tractors which have mount attachments on the forward end in a different structural configuration than those shown in the drawings, by virtue of the wide range of possible mounting positions along the elongated perforated members 30. By necessity structural variations of tractors may make it necessary to mount the forward end of the bulldozer structure to the front tractor axle or front cross member whatever as the specific case may be. It is to be noted that a minimal number of bolts are needed to mount the bulldozer structure 12, thus providing for easy attachment and removal.

In the use and operation of the bulldozer structure 12 of this invention, it is obvious that the device provides a bulldozer structure which can be easily mounted on a wide variety of styles and makes of tractors by the use of different mounting brackets to connect the specific tractor structure to the mounts of the bulldozer structure 12. In addition to being easily attachable to a tractor structure, the bulldozer structure 12 of this invention is as easily removable from the tractor structure as it is attachable thereto, which provides for versatility in using the tractor with and without the bulldozer structure of this invention. Additionally, the bulldozer structure 12 has an earthworking blade assembly 18 which is easily raised and lowered relative to the tractor and which can be easily turned in its angular position. Changing the angular position of the earthworking blade assembly 18 is accomplished by removing the locking pin or pins from the blade mount block 42, turning the blade and re-inserting the pins. Raising and lowering of the earthworking blade assembly and mount assembly is preferably done either by use of the screw operator 70 or the hydraulic operator 72 as is described above. The bulldozer structure 12 is designed and constructed so the pivot pin 48 forms a fulcrum pin positioned to be perpendicular to the ground when in use. When the bulldozer structure is in use and the blade assembly 18 is angled in either direction, the perpendicular pivot pin 48 causes the blade point and blade heel to stay level. It is very important that the blade assembly 18 be level when scraping snow and when grading.

In the manufacture of the bulldozer structure 12 of this invention, it is obvious that the structure can be constructed using conventional techniques and materials currently used with manufacture of such articles to achieve the end product. The structural capacity of the bulldozer structure 12 of this invention can be varied by changing the relative sizes of the members thereof in relation to the relative size of the tractor on which it is to be mounted. It is seen that the bulldozer structure 12 can be constructed for manufacturing purposes with the same basic support frame assembly, mounting assembly, earthworking blade assembly 18, and an operator 20. The bulldozer structure 12 can be used with different mounting brackets and the like to mount it on different types and styles of conventional tractors.

As will become apparent from the foregoing description of the applicant's bulldozer structure, relatively versatile means have been provided to mount a bulldozer frame structure on various makes and styles of tractors. The bulldozer structure is simple to install in that it requires a minimal amount of mounting, it is flexible in adaptation due to the universal type mounting arrangement, and it is easy to operate due to its simple operator and pivot design.

While the invention has been described in conjunction with preferred specific embodiments thereof, it will be understood that this description is intended to illustrate and not to limit the scope of the invention, which is defined by the following claims.

I claim:

1. Bulldozer means comprising:
   a. frame support means having mounting means adapted to mount said bulldozer means on a vehicle,
   b. other mounting means with said support means, pivotable about a horizontal axis,
   c. earthworking means mounted on said last-named mounting means by a single pivot to be pivotable about an upright axis in an upright plane transverse to said frame support means,
   d. locking means engageable with said last-named mounting means and said earthworking means to fix the relative position of said mounting means and said earthworking means,
   e. means to raise and lower said last-named mounting means,
   f. said frame support means has a pair of elongated members horizontally mountable under a vehicle with an upright portion on one end portion joined by a transverse member on their upper portion, and means to mount said elongated members with said vehicle,
   g. said last-named mounting means is attached to the forward end portion of said elongated members, and has said earthworking means pivot on the outer end portion thereof,
   h. said earthworking means has means to attach same to said earthworking means pivot, and
   i. said means to raise and lower said last-named mounting means is an operator connected between said mounting means and said transverse member and extended forwardly of said horizontal axis to rotate said mounting means about said horizontal axis, said bulldozer means being adapted to be mounted on a vehicle and have the earthworking means transversely and vertically adjustable relative thereto.

2. The bulldozer means as described in claim 1, wherein:
   a. said means to mount said elongated members has a multi-aperture flange member secured to the forward end portion of said elongated members and a rear mount member extended from a rear portion of said elongated members and adjustably connected thereto, b. said means to attach said earthworking means is a flange portion extending from said earthworking means to engage said last-named mounting means to pivot said earthworking means about a vertical axis relative to said mounting means, and c. said rear portion of said elongated members are joined together and have said rear mount member mounted therewith.

3. The bulldozer means as described in claim 2, wherein:

a. said means to raise and lower said last-named mounting means is a hydraulic cylinder, operable by a powering means.

4. The bulldozer means as described in claim 2, wherein:

a. said means to raise and lower said last-named mounting means is a turnbuckle means operable by hand action.

* * * * *